UNITED STATES PATENT OFFICE.

NICHOLAS JOSEPH CLAYTON, OF GALVESTON, TEXAS.

COMPOSITION TO BE USED AS A NON-CONDUCTOR OF HEAT AND FOR OTHER PURPOSES.

SPECIFICATION forming part of Letters Patent No. 369,099, dated August 30, 1887.

Application filed January 12, 1887. Serial No. 224,131. (No specimens.)

*To all whom it may concern:*

Be it known that I, NICHOLAS JOSEPH CLAYTON, of the city and county of Galveston, and State of Texas, have invented a new and useful Composition to be Used as a Non-Conductor of Heat and for other Purposes, of which the following is a full, clear, and exact description.

This invention has for its object the production of a new composition, plastic compound, or substance, which I term "fiber pierre" or "fibrous stone," the same to be used, among other purposes, as a non-conducting material for the protection of steam-boilers, and hot-air or water pipes from loss of heat by radiation, also for the protection of water, gas, and steam pipes from injury by the action of frost, and as a non-conducting packing for various purposes, as a non-conducting material for ice-chests, refrigerators, safes, and walls of houses, for fire-proof purposes, and the deafening of floors and partitions, and also as a substitute for "papier-maché" or "carton pierre" for different purposes, including the producing of artistic and decorative effects, stage properties and appliances, and the plastering of walls and ceilings.

The basis of my new composition or compound is the cotton-seed hulls or waste of cotton-seed-oil mills. These I render incombustible by saturating them with a varying solution of from one to twenty per cent. of a solution of alum mixed with more or less water, and afterward either dry the saturated hulls or not, as found most advantageous or as different circumstances may require. Other solutions, however, having the property of rendering the cotton-seed hulls incombustible—as, for instance, an aqueous solution of lime, such as lime-water—may be used. These prepared cotton-seed hulls I combine with sawdust treated with a hydrate of lime to render the mass incombustible and as a preservative against dry rot.

The material prepared as above described I mix with plaster-of-paris and water as a cementing substance or binder, in varying proportions of one part of plaster to four (more or less) of cotton-seed hulls and accompanying ingredients, using, by preference, commercially-pure plaster-of-paris in connection with the prepared hulls, sawdust, &c.

If desired, the prepared cotton-seed hulls may be otherwise incorporated with a binder and other ingredients. Thus in some cases I propose to use a combined varying proportion of plaster-of-paris with sand or burned brick clay in a granulated condition or cinders in a similar condition, and in connection with the prepared sawdust; or any or all of these materials, at option, may be combined and incorporated with the prepared cotton-seed hulls, and the mass either be subjected to pressure or when used be applied by hand or by suitable tools or appliances; or the mass may be cast in molds or formers, and be either loosely shaped or compressed to a greater or less extent in molds or otherwise, according to the purpose for which the material is required.

What I claim as new, and desire to secure by Letters Patent, is—

1. The herein-described composition of matter, consisting of cotton-seed hulls or waste or refuse of cotton-seed-oil mills, treated with a solution of alum or its equivalent, in or about the proportions specified, and for the purposes herein set forth.

2. The herein-described composition of matter, consisting of cotton-seed hulls or waste or refuse of cotton-seed-oil mills, treated with a solution of alum or its equivalent, and combined with plaster-of-paris as a binder, essentially as and for the purposes specified.

3. The herein-described composition of matter, consisting of cotton-seed hulls or waste or refuse of cotton-seed-oil mills, treated with a solution of alum or its equivalent, with comminuted materials, as described, and combined with plaster-of-paris as a binder, substantially as specified.

NICHOLAS JOSEPH CLAYTON.

Witnesses:
PATRICK J. RABITT,
WILLIAM J. SMITH.